United States Patent
Dörnen et al.

(10) Patent No.: US 12,259,026 B2
(45) Date of Patent: Mar. 25, 2025

(54) ACTUATING DRIVE COMPRISING A TORQUE-LIMITING DEVICE

(71) Applicant: Edscha Engineering GmbH, Remscheid (DE)

(72) Inventors: Jörg Dörnen, Remscheid (DE); Christian Bartschies, Remscheid (DE); Christoph Schmidt, Remscheid (DE); Jochen Bals, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 96 days.

(21) Appl. No.: 17/802,911

(22) PCT Filed: Mar. 1, 2021

(86) PCT No.: PCT/DE2021/100206
§ 371 (c)(1),
(2) Date: Aug. 26, 2022

(87) PCT Pub. No.: WO2021/175370
PCT Pub. Date: Sep. 10, 2021

(65) Prior Publication Data
US 2023/0090696 A1   Mar. 23, 2023

(30) Foreign Application Priority Data
Mar. 3, 2020   (DE) .................. 102020105716.4

(51) Int. Cl.
*F16H 25/24* (2006.01)
*E05F 15/622* (2015.01)
(Continued)

(52) U.S. Cl.
CPC ....... *F16H 25/2021* (2013.01); *E05F 15/622* (2015.01); *F16D 7/021* (2013.01);
(Continued)

(58) Field of Classification Search
CPC ................. F16D 7/021; F16H 25/2021; F16H 2025/2071; F16H 25/2454
See application file for complete search history.

(56) References Cited

U.S. PATENT DOCUMENTS

| 5,371,640 A | 12/1994 | Kvifte et al. |
| 2003/0050121 A1 | 3/2003 | Takada et al. |

(Continued)

FOREIGN PATENT DOCUMENTS

| CN | 1407251 A | 4/2003 |
| CN | 1754034 A | 3/2006 |

(Continued)

OTHER PUBLICATIONS

International Search Report for PCT/DE2021/100206.

*Primary Examiner* — Gregory Robert Weber
(74) *Attorney, Agent, or Firm* — Davidson Kappel LLC

(57) ABSTRACT

The invention relates to a control drive, in particular a spindle drive for adjusting a swivelable vehicle flap, comprising a housing (2), a spindle rod (3) that is rotatably mounted in the housing (2), a first coupling element (5) for driving a rotational movement of the spindle rod (3), and a torque-limiting device (6) arranged between the first coupling element (5) and the spindle rod (3) for limiting the torque transmitted from the first coupling element (5) to the spindle rod (3), comprising an adapter sleeve (8) arranged at a first end (3a) of the spindle rod (3) in a rotationally fixed manner, and a first tolerance element (13) arranged between the spindle rod (3) and the first coupling element (5). According to the invention, a control drive is provided, which is designed such that it is compact and can be economically produced, in such a way that the first tolerance element (13) is rotationally fixed to one of the first coupling element (5) and the adapter sleeve (8).

21 Claims, 2 Drawing Sheets

(51) Int. Cl.
*F16D 7/02* (2006.01)
*F16H 25/20* (2006.01)

(52) U.S. Cl.
CPC .... *F16H 25/2454* (2013.01); *E05Y 2201/214* (2013.01); *F16H 2025/2031* (2013.01)

(56) References Cited

U.S. PATENT DOCUMENTS

| | | |
|---|---|---|
| 2006/0207058 A1 | 9/2006 | Heinrichs et al. |
| 2006/0276246 A1 | 12/2006 | Needes et al. |
| 2010/0162839 A1 | 7/2010 | Reif et al. |
| 2011/0017484 A1 | 1/2011 | Roehm et al. |
| 2011/0290050 A1 | 12/2011 | Kummer et al. |
| 2014/0083226 A1 | 3/2014 | Sakai |
| 2014/0166423 A1 | 6/2014 | Nias et al. |
| 2016/0230814 A1 | 8/2016 | Schumann et al. |
| 2019/0242171 A1* | 8/2019 | Wittelsbuerger ....... F16D 59/02 |
| 2019/0363602 A1 | 11/2019 | Oberndoerfer et al. |
| 2020/0370357 A1 | 11/2020 | Schmengler et al. |
| 2021/0180653 A1* | 6/2021 | Slayne .................... F16D 7/021 |
| 2022/0127894 A1* | 4/2022 | Henzler ................ F16D 1/0835 |

FOREIGN PATENT DOCUMENTS

| | | | | |
|---|---|---|---|---|
| CN | 101961866 A | | 2/2011 | |
| CN | 203567524 U | | 4/2014 | |
| CN | 110089011 A | | 8/2019 | |
| DE | 3628285 A1 | | 3/1987 | |
| DE | 19545379 C1 | | 4/1997 | |
| DE | 102008008541 B3 | | 3/2009 | |
| DE | 102008031228 A1 | | 1/2010 | |
| DE | 102008061115 A1 | * | 6/2010 | ............ E05F 1/1091 |
| DE | 1020008061115 A1 | | 6/2010 | |
| DE | 102014100125 A1 | * | 7/2015 | ............ E05F 15/622 |
| DE | 102016113353 A1 | | 1/2018 | |
| DE | 102018100562 A1 | | 7/2019 | |
| DE | 102019102857 A1 | * | 8/2020 | ............. B60J 5/107 |
| DE | 102019130423 A1 | * | 5/2021 | |
| EP | 1731783 A2 | | 12/2006 | |
| EP | 2159438 A1 | | 9/2008 | |
| EP | 2196612 A2 | | 6/2010 | |
| EP | 3232076 A1 | | 10/2017 | |
| EP | 3032020 B1 | | 11/2018 | |

* cited by examiner

ACTUATING DRIVE COMPRISING A TORQUE-LIMITING DEVICE

The invention relates to an actuating drive, in particular for adjusting a pivotable vehicle flap, comprising a housing, a spindle rod rotatably mounted in the housing, a first coupling element for driving a rotational movement of the spindle rod and a torque-limiting device arranged between the first coupling element and the spindle rod for limiting the torque transmitted from the first coupling element to the spindle rod.

In practice, actuating drives are known, which are frequently designed as linear drives, which are used for automatically adjusting a vehicle flap, for example a lateral vehicle door or a tailgate. Such actuating drives thereby comprise a housing that generally consists of two housing parts arranged concentrically inside one another, so that the length of the housing is variable in length by displacing the housing parts relative to one another. For this purpose, a spindle drive, which drives the displacement of the housing parts, is arranged in the housing. The spindle drive generally comprises a spindle rod rotatably mounted in the housing and a corresponding spindle nut, wherein the spindle nut is fixedly connected to one of the two housing parts and is thus moved in a translatory manner upon actuation of the spindle rod. The spindle rod is rotatably driven by a coupling element. The coupling element is, for example, an output shaft of an electric motor or a transmission part, which is provided between the spindle rod and the electric motor.

In order to avoid mechanical overloading by external forces, actuating drives frequently have a torque-limiting device that serves to limit the torque transmitted from the coupling element to the spindle rod. In addition, such actuating drives also have a brake device that is intended to prevent unintentional adjustment of the vehicle flap by external mechanical forces and also defines the run-out behavior of the actuating drive. The brake device and the torque-limiting device are advantageously arranged axially in series and require a large installation space within the housing.

EP 3 032 020 B1 shows an actuating drive for automatically adjusting a vehicle door, in particular a tailgate, comprising a housing, wherein the housing comprises a first tubular housing part and a second tubular housing part that can be moved telescopically relative to one another. The actuating drive further comprises a spindle rod rotatably mounted in the housing, a coupling element designed as an outer shell and a torque-limiting device arranged between the coupling element and the spindle rod for limiting the torque transmitted from the coupling element to the spindle rod. The torque-limiting device comprises an adapter sleeve designed as a dowel pin, wherein the adapter sleeve is arranged between the spindle rod and the coupling element. A disadvantage of the actuating drive shown is that the adapter sleeve has a considerable structural volume and is accordingly expensive to manufacture due to the amount of material required. Moreover, as a result of the friction, the coupling element has to be cured, which also increases the production costs.

DE 36 28 285 A1 shows an electric actuating drive comprising a housing, a spindle rod rotatably mounted in the housing, a rotor for driving a rotational movement of the spindle rod and a torque-limiting device arranged between the rotor and the spindle rod for limiting the torque transmitted from the rotor to the spindle rod. The torque-limiting device comprises a flange, which is arranged at a first end of the spindle rod in a rotationally fixed manner, and an armature fastened to the flange via a screw connection. A cylindrical projection is provided on the armature, which projection extends frictionally into a corresponding recess in the rotor. A disadvantage of the actuating drive shown is that the torque-limiting device occupies a large installation space and requires high material outlay with correspondingly high costs.

DE 195 45 379 C1 shows an actuating drive comprising a housing and a spindle rod rotatably mounted in the housing, wherein the spindle rod is connected in a rotatably fixed manner to a motor shaft for driving a rotary movement of the spindle rod.

EP 2 159 438 A1 shows a torque-limiting device comprising a pot-shaped coupling portion formed at a first end of a spindle rod and an output shaft projecting into the pot-shaped coupling portion for driving a rotational movement of the spindle rod. A tolerance element, which limits a limit value of the torque transmitted from the output shaft to the spindle rod, is arranged radially between the coupling portion of the spindle rod and the output shaft. A disadvantage of the torque-limiting device shown is that the tolerance element is only connected by friction with respect to the output shaft as well as with respect to the coupling portion of the spindle rod, so that no precise definition of the corresponding limit value of the torque transmission is ensured.

DE 10 2008 031 228 A1 shows a spindle drive for adjusting a pivotable vehicle flap, comprising a housing, a spindle rod rotatably mounted in the housing, a transmission shaft for driving a rotational movement of the spindle rod and a torque-limiting device arranged between the transmission shaft and the spindle rod for limiting the torque transmitted from the first transmission shaft to the spindle rod. The torque-limiting device thereby comprises an adapter sleeve, which is arranged at a first end of the spindle rod in a rotationally fixed manner, and a tolerance element, which is arranged between the spindle rod and the adapter sleeve and is designed as a tolerance ring. A disadvantage of the spindle drive shown is that the tolerance ring is only fixed by friction both with respect to the transmission shaft and to the adapter sleeve, so that there is no well-defined threshold value of the torque, at which the torque-limiting device produces a decoupling between the transmission shaft and the spindle rod.

US 2014/0166423 A1 shows a tolerance element, wherein the tolerance element can be arranged radially between an inner component and an outer component in order to limit a transmission of a torque between the two components.

US 2011/0290050 A1 shows a actuating drive comprising a housing, a spindle rod rotatably mounted in the housing, wherein the spindle rod can be rotatably driven by coupling to a motor.

DE 10 2018 100 562 A1 shows a actuating drive for adjusting a pivotable vehicle flap, comprising a housing and a spindle rod mounted rotatably in the housing, wherein the spindle rod is rotatably driven via a drive device.

DE 10 2008 008 541 B3 shows an operating device for a valve or a fitting having a torque-limiting device that can be controlled by cam and rocker arm.

EP 3 232 076 A1 shows a coupling element designed as a wrap spring, which can be arranged between a first end of a spindle rod and a drive-side spring cup for torque limitation.

It is the object of the invention to provide an actuating drive that is compact and can be produced cost-effectively.

This object is achieved according to the invention by an actuating drive having the features according to claim 1 or according to claim 15.

According to one aspect of the invention, a actuating drive, in particular a spindle drive for adjusting a pivotable vehicle flap, is provided, comprising a housing, a spindle rod that is rotatably mounted in the housing, a first coupling element for driving a rotational movement of the spindle rod and a torque-limiting device arranged between the first coupling element and the spindle rod for limiting the torque transmitted from the first coupling element to the spindle rod. The torque-limiting device comprises an adapter sleeve that is arranged at a first end of the spindle rod in a rotationally fixed manner, and a first tolerance element arranged between the spindle rod and the first coupling element. The actuating drive according to the invention is characterized in that the first tolerance element is rotationally fixed to one of the first coupling element and the adapter sleeve. Advantageously, an actuating drive is thus provided, which has a well-defined threshold value of the torque, at which the torque-limiting device produces a decoupling between the coupling element and the spindle rod. In addition, by using an adapter sleeve, a tolerance element with reduced thickness can be used, wherein the friction properties and thus the choice of the threshold value for the torque can be selected by configuring the surface of the tolerance element. Furthermore, curing the coupling element or the adapter sleeve is not necessary, thus reducing the production costs considerably.

Particularly preferably, the one of the first coupling element and the adapter sleeve comprises at least one first retaining element. The first retaining element prevents, preferably by means of a positive fit, a rotational movement of the first tolerance element relative to the one of the first coupling element and the adapter sleeve in at least one rotational direction.

In an expedient embodiment, the first retaining element is embodied as a projection having a first lateral support surface and a second lateral support surface opposite the first lateral support surface. Preferably, the first retaining element is formed integrally with the one of the first coupling element and the adapter sleeve. Advantageously, when the first coupling element or the adapter sleeve is produced, the retaining element can be integrally molded from plastic in an injection molding process, for example, in a common manufacturing step. In particular, it is advantageously ensured that the retaining element cannot detach from the one of the first coupling element and the adapter sleeve.

In a particularly preferred development, it is provided that the first tolerance element is supported at least on the first lateral support surface of the first retaining element. Thereby it is advantageously prevented, by means of a positive fit, that the first tolerance element is able to be rotated in the direction of the first lateral support surface, since the first tolerance element strikes the first lateral support surface and cannot rotate further.

In a first preferred embodiment, the first tolerance element is supported on the first lateral support surface and on the second lateral support surface of the first retaining element. Advantageously, a rotationally fixed connection is thereby produced for both directions of rotation between the first tolerance element and the one of the coupling element and the adapter sleeve.

The first tolerance element is preferably designed as a partially cylindrical shell segment. The first tolerance element expediently has stampings oriented in a radial direction towards the one of the coupling element and the adapter sleeve. Advantageously, by means of the stampings, a radial pretensioning is achieved between the coupling element and the adapter sleeve. The limit value of the torque, from which value the tolerance element slips with respect to the other one of the coupling element and the adapter sleeve, is defined substantially by the surface of the tolerance element and the pretensioning produced via the stampings.

Particularly preferably, the torque-limiting device comprises a second tolerance element. In a particularly preferred development, it is provided that the second tolerance element is supported at least on the second lateral support surface of the first retaining element. By the provision of a second tolerance element advantageously an improvement of the distribution of the frictional forces to be absorbed, which arises due to the friction of the tolerance element with the other one of the coupling element and the adapter sleeve, is achieved.

In a particularly preferred development, the one of the first coupling element and the adapter sleeve has at least one second retaining element. In a first preferred embodiment, the second retaining element is arranged opposite the first retaining element. In an expedient embodiment, the second retaining element is designed as a projection having a first lateral support surface and a second lateral support surface opposite the first lateral support surface. The second retaining element is preferably formed integrally with the one of the first coupling element and the adapter sleeve. Advantageously, two tolerance elements can thus be arranged symmetrically to one another and rotationally fixed to the one of the coupling element and the adapter sleeve.

In an alternative development, the first tolerance element is particularly advantageously supported on the first lateral support surface of the first retaining element and on the first lateral support surface of the second retaining element. Advantageously, the first tolerance element is secured against rotation between the first retaining element and the second retaining element and is rotationally fixed to the one of the coupling element and the adapter sleeve.

The second tolerance element is expediently supported on the second lateral support surface of the first retaining element and on the second lateral support surface of the second retaining element. Advantageously, the second tolerance element is secured against rotation between the first retaining element and the second retaining element and is rotationally fixed on the one of the coupling element and the adapter sleeve. The first tolerance element and the second tolerance element are preferably spaced apart from one another by the first retaining element and the second retaining element.

In a preferred embodiment of the actuating drive, it is provided that the first coupling element has a hollow cylindrical receptacle that faces the spindle rod and has a base and a side wall. Particularly preferably, the base is annular. Expediently, the inner side of the side wall, which faces the receptacle, forms a friction surface via which the frictional force transmission between the coupling element and the spindle rod or the adapter sleeve is conveyed.

In a preferred development, the first tolerance element and the adapter sleeve are accommodated at least partially in the hollow cylindrical receptacle. Particularly preferably, the first tolerance element and the adapter sleeve are accommodated completely in the hollow cylindrical receptacle. This advantageously achieves a particularly compact design of the torque-limiting device, so that the overall length of the actuating drive can be reduced.

The first retaining element is preferably arranged on an inner side of the side wall of the hollow cylindrical receptacle. Advantageously, the first tolerance element can thereby be rotationally fixed to the coupling element. Expediently, the first tolerance element abuts flat against the inner side of the side wall of the hollow cylindrical receptacle and is fixed with respect to a rotation by the first retaining element.

In a preferred embodiment, it is provided that a brake assembly is arranged in the housing, wherein the brake assembly comprises a brake housing. The brake housing is preferably arranged concentrically around a first end of the spindle rod. The brake assembly is advantageously used for braking the rotational movement of the spindle rod, in order to control the run-out behavior when the motor driving the spindle rod or driving the coupling element is switched off.

Preferably, the first coupling element at least partially penetrates the brake housing of the brake assembly. A compact design of the actuating drive is thereby achieved, since the brake assembly and the torque-limiting device thereby axially overlap and the overlap region thereby results in a shortening of the actuating drive.

According to a further aspect invention, an actuating drive, in particular a spindle drive for adjusting a pivotable vehicle flap, is provided. The actuating drive comprises a housing, a spindle rod rotatably mounted in the housing and a first coupling element for driving a rotational movement of the spindle rod. Further, the actuating drive comprises a torque-limiting device arranged between the first coupling element and the spindle rod for limiting the torque transmitted from the first coupling element to the spindle rod, and a brake assembly, wherein the brake assembly comprises a brake housing. The actuating drive according to the invention is characterized in that the torque-limiting device and the brake assembly overlap axially at least in part. Advantageously, the actuating drive has a shortened overall length compared to the actuating drives known from the prior art, which have both a brake assembly and a torque-limiting device, so that the actuating drive according to the invention has a compact design.

In an advantageous embodiment, the brake assembly comprises a first brake element, wherein the first brake element is connected to the spindle rod in a rotationally fixed manner. The first brake element is preferably designed as an annular inner lamella and has an inner gear on its inner diameter. Particularly preferably, the spindle rod has a groove profile that meshes with the inner gear of the first brake element. Advantageously, a reliable rotationally fixed connection is thereby produced between the spindle rod and the first brake element. Further advantageously, however, the first brake element is thereby axially displaceable relative to the spindle rod.

In an expedient embodiment, the brake assembly comprises a second brake element, wherein the second brake element is connected to the brake housing in a rotationally fixed manner. The second brake element is expediently designed as an annular disk having a plurality of projections that are directed radially outward, wherein the projections penetrate slot-shaped recesses of the brake housing. Advantageously, the second brake element is connected in a rotationally fixed manner to the spindle rod yet is axially displaceable along a longitudinal axis of the spindle rod. Advantageously, the first brake element and the second brake element can be pretensioned against one another and thus the braking force acting on the spindle rod can be controlled. In an expedient development, an intermediate element is arranged between the first brake element and the second brake element. The intermediate element is preferably designed as an annular disk made of a carbon fabric, in particular a mesh of carbon fibers embedded in a plastic.

In a preferred embodiment, the brake assembly comprises a pretensioning means for axially pretensioning the first brake element to the second brake element for generating a braking force. Particularly preferably, the pretensioning means is designed as a wave spring. The pretensioning means preferably surrounds the first end of the spindle rod concentrically. Advantageously, by means of the pretensioning means, a predefined braking force is generated by means of the friction between the first brake element and the second brake element, preferably conveyed via the intermediate element.

The torque-limiting device preferably comprises an adapter sleeve, which is arranged in a rotationally fixed manner at a first end of the spindle rod, and a tolerance element, wherein the tolerance element is arranged radially between the adapter sleeve and the first coupling element. Particularly preferably, the pretensioning means and one of the adapter sleeve and the tolerance element overlap axially at least in sections. The torque-limiting device is expediently partially inserted into the brake assembly through an opening provided in the brake housing. Advantageously, the functions of the torque-limiting device and the brake assembly continue to be completely fulfilled and a compact design of the actuating drive is achieved by means of the overlapping of the torque-limiting device and the brake assembly provided in the axial direction.

Further advantages, properties and developments of the invention emerge from the following description of a preferred embodiment and from the dependent claims.

The invention is explained in more detail below with reference to the accompanying drawings using a preferred exemplary embodiment.

Figure 1:
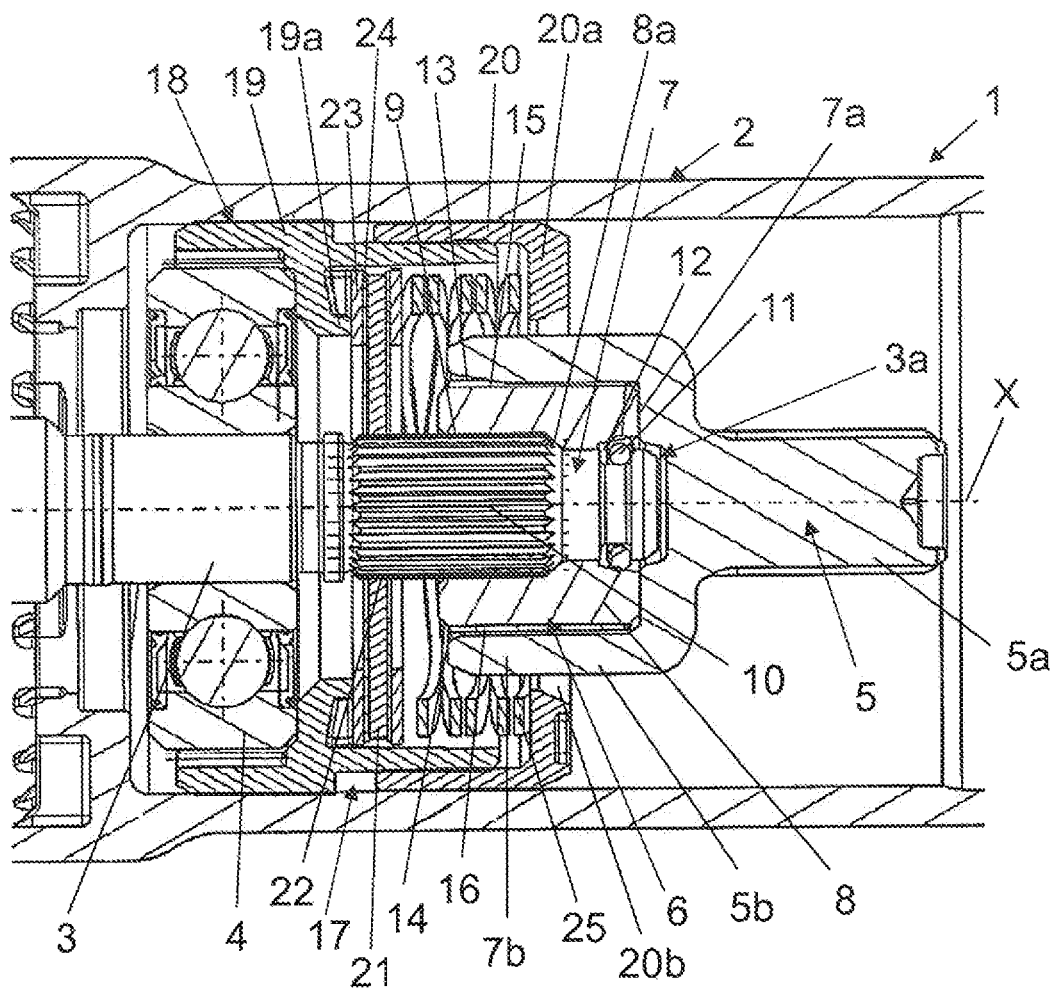
FIG. 1 shows a preferred exemplary embodiment of an actuating drive in a lateral cross-sectional view.

FIG. 1 shows a preferred exemplary embodiment of an actuating drive 1 in a lateral cross-sectional view. The actuating drive 1, shown in sections, comprises a housing 2, wherein the housing 2 is hollow cylindrical and concentrically surrounds a spindle rod 3. The spindle rod 3 is rotatably mounted in the housing 2 via a ball bearing 4.

In a section (not shown here), the spindle rod 3 has a drive thread that meshes with a spindle nut (not shown here) with a corresponding internal thread, so that when the spindle rod 3 rotates, the spindle nut is displaceable together with a housing part of the housing 2 in the direction of a longitudinal axis X of the spindle rod 3.

To drive the rotational movement of the spindle rod 3, a coupling element 5 is coupled to a first end 3a of the spindle rod 3, wherein a torque-limiting device 6 is arranged between the coupling element 5 and the spindle rod 3, said torque-limiting device 6 limiting a torque transmitted from the first coupling element 5 to the spindle rod 3. Advantageously, the torque-limiting device 6 can be used to decouple excessive external forces, which occur, for example, by an action on the vehicle flap, for example a collision with an obstacle, from the transmission section or the electric motor. This advantageously makes it possible to avoid damage to the electric motor or the transmission.

The coupling element 5 is designed as a transmission adapter, wherein the coupling element 5 comprises a first end 5a facing away from the spindle rod 3, which end 5a is designed in the form of a pin and can be connected to a transmission (not shown here) or an output shaft of a motor. Furthermore, the coupling element 5 comprises a second end 5b facing the spindle rod 3, which second end is designed to be pot-shaped and forms a hollow cylindrical receptacle 7. The hollow cylindrical receptacle 7 has an annular base 7a and a hollow cylindrical side wall 7b. The torque-limiting device 6 is accommodated in the hollow cylindrical receptacle 7.

The torque-limiting device 6 is designed as a slip clutch and comprises an adapter sleeve 8 arranged in a rotationally fixed manner at the first end 3a of the spindle rod 3. The adapter sleeve 8 has a hollow cylindrical design and has an inner gear 9 comprising teeth at an end facing the spindle rod 3, which teeth run on the inner circumference of the adapter sleeve 8 in the direction of the longitudinal axis X of the spindle rod 3.

The spindle rod 3 has a groove profile 10 extending along its longitudinal axis X, which meshes with the inner toothing 9 provided on the inner circumference of the adapter sleeve 8. As a result, a rotationally fixed connection between the adapter sleeve 8 and the spindle rod 3 is provided. In this case, the inner circumference of the adapter sleeve 8 tapers to form a step 8a, so that the adapter sleeve 8 is secured axially at least in one direction. Advantageously, the adapters 8 can be pushed onto the first end 3a of the spindle rod 3, wherein a mounting position of the adapter sleeve is defined by the step 8a on the inner circumference of the adapter sleeve 8.

The adapter sleeve 8 serves substantially to bridge the radial intermediate space between the first end 3a of the spindle rod 3 and the hollow cylindrical side wall 7b of the receptacle 7 of the coupling element 5, in order to produce a force-fitting coupling based on frictional forces between the spindle rod 3 and the coupling element 5. Advantageously, a reliable coupling between the spindle rod 3 and any coupling element with an optionally smaller or larger receptacle can thus be produced by appropriate adaptation of the adapter sleeve 8.

The adapter sleeve 8 is secured axially on the spindle rod 3 by a locking ring 11. The locking ring 11 is arranged in an annular groove 12 provided on the first end 3a of the spindle rod 3. The locking ring 11 is designed as an elastic O-ring. The pressing forces required to push on the adapter sleeve 8 are significantly less than the pull-off forces needed to remove the adapter sleeve 8. Advantageously, the adapter sleeve 8 can thus be easily mounted on the spindle rod 3 by pushing the adapter sleeve 8 onto the first end 3a of the spindle rod 3 with a little force. The adapter sleeve 8 is then secured axially relative to the spindle rod 3 by the locking ring 11.

Furthermore, the torque-limiting device 6 comprises a first tolerance element 13 arranged radially between the adapter sleeve 8 and the inner side of the hollow cylindrical side wall 7b of the coupling element 5 and a second tolerance element 14. The first tolerance element 13 and the second tolerance element 14 are rotationally fixed on the inner side of the hollow cylindrical side wall 7b of the coupling element 5. For this purpose, on the hollow cylindrical side wall 7b a first retaining element 15 and a second retaining element 16 are provided, which prevent a rotation of the first tolerance element 13 or of the second tolerance element 14, as explained in more detail below.

The actuating drive 1 further comprises a brake assembly 17, which serves to brake the rotational movement of the spindle rod 3. This should advantageously improve the run-out behavior when the drive of the rotary movement of the spindle rod 3 is switched off, so that a precise adjustment of a pivotable vehicle flap is made possible.

The brake assembly 17 comprises a brake housing 18 that is formed by a first brake housing part 19 and a second brake housing part 20. The first brake housing part 19 is designed as a stepped hollow cylinder and has an annular stop 19a along its inner side. The second brake housing part 20 is designed as a hollow cylinder having an annular collar 20a, which is directed radially inwards and which forms an upper side of the second brake housing part 20. The second brake housing part 20 is attached to the first brake housing part 19 like a cover, so that sufficient protection against contamination of the components present in the brake housing 18 is ensured and, at the same time, an axial displacement of the first brake housing part 19 and of the second brake housing part 20 is possible during assembly.

Furthermore, the brake assembly 17 comprises a first annular brake element 21, which is designed as an inner lamella and, on its inner diameter, comprises an inner gear 22, which engages with the groove profile 10 of the spindle rod 3. As a result, the first brake element 21 is axially displaceable along the longitudinal axis X of the spindle rod 3 and is simultaneously connected to the spindle rod 3 in a rotationally fixed manner. A second annular brake element 23 is arranged on an inner diameter of the first brake housing part 19 of the brake housing 18 in a floating manner, but an annular intermediate element 24, which is designed as a disk made of carbon fabric, is arranged in a rotationally fixed manner between the first brake element 21 and the second brake element 23. The second brake element 23 rests on the annular stop 19a of the first brake housing part 19.

The brake assembly 17 further comprises a pretensioning means 25 designed as a wave spring, which pretensions the first brake element 21 to the second brake element 23, so that the intermediate element 24 is clamped between the first brake element 21 and the second brake element 23, and a braking effect on the rotational movement of the spindle rod 3 is thus realized by means of the friction. The pretensioning means 25 is arranged axially between the collar 20a of the second brake housing part 20 and the brake elements 21, 23, wherein the second brake element 23 abuts against the annular stop 19a of the first brake housing part 19. Advantageously, the pretensioning means 25 can be pretensioned and thus concomitantly the braking force acting on the spindle rod 3 by the brake assembly 17 can be set by adjusting the relative axial position of the first brake housing part 19 and of the second brake housing part 20. After setting, the first brake housing part 19 is fixedly connected to the second brake housing part 20, in order to fix the relative axial position of the first brake housing part 19 and the second brake housing part 20.

The second brake housing part 20 has on its upper side an opening 20b delimited by the collar 20a. The torque-limiting device 8 penetrates the opening 20b in the second brake housing part 20. As a result, the brake assembly 17 and the torque-limiting device 6 overlap axially. An embodiment of a combination of the brake assembly 17 and the torque-limiting device 6 that is compact in the axial direction is thus advantageously provided.

Figure 2:
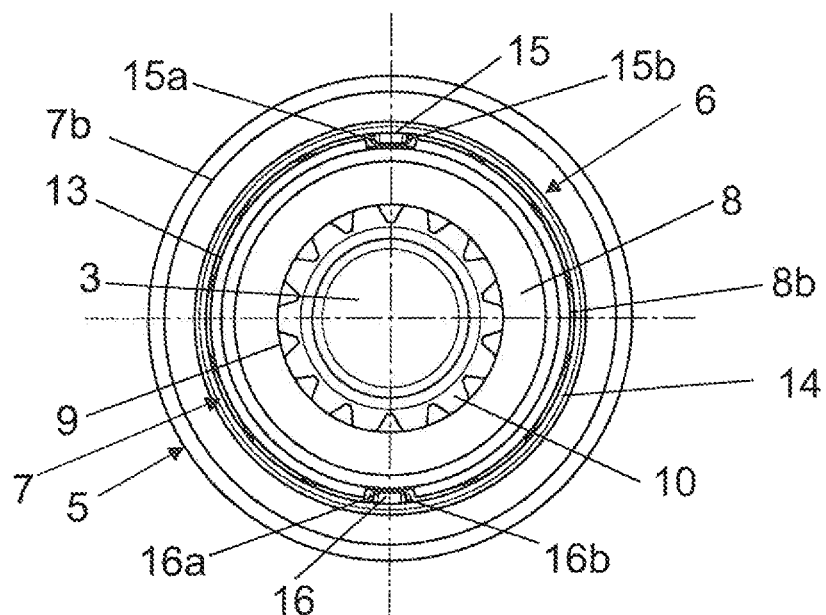
FIG. 2 shows a frontal cross-sectional view of the torque-limiting device from FIG. 1 of the actuating drive.

FIG. 2 shows a frontal cross-sectional view of the torque-limiting device 6 from FIG. 1 of the actuating drive 1. In this view, it can be clearly seen that the side wall 7b of the coupling element 5 concentrically surrounds the torque-limiting device 8. It can also be seen that the first retaining element 15, which is designed as a projection in each case, and the second retaining element 18 are arranged opposite one another projecting radially inward from the inside of the side wall 7b of the coupling element 5.

The first retaining element 15 has a first lateral support surface 15a and a second lateral support surface 15b opposite the first lateral support surface 15a. Accordingly, the second retaining element 16 also has a first lateral support surface 16a and a second lateral support surface 16b opposite the first lateral support surface 16a. The first tolerance element 13 and the second tolerance element 14 are arranged between the side wall 7b of the coupling element 5 and the adapter sleeve 8 accommodated in the receptacle 7. The first tolerance element 13 is clamped between the first lateral support surface 15a of the first retaining element 15 and the first lateral support surface 16a of the second retaining element 16. As a result, a rotationally fixed connection between the first tolerance element 13 and the coupling element 5 is produced and at the same time a pretension is generated, so that the first tolerance element 13 abuts against the inner side of the side wall 7b of the coupling element 5. Accordingly, the second tolerance element 14 is clamped between the second lateral support surface 15b of the first retaining element 15 and the second lateral support surface 16b of the second retaining element 16.

FIG. 2 further shows that the adapter sleeve 8 has an inner gear 9 along an inner circumference and that the inner gear 9 meshes with the groove profile 10 of the spindle rod 3 and thus a rotationally fixed connection exists between the adapter sleeve 8 and the spindle rod 3. Advantageously, the rotationally fixed connection between the adapter sleeve 3 and the spindle rod 3 on one side and the rotationally fixed connection between the first tolerance element 13 or the second tolerance element 14 with the coupling element 5 on the other side ensures that, when a threshold value of the torque acting on the spindle rod 3 is exceeded, the spindle rod 3, together with the adapter sleeve 8, slips with respect to the first tolerance element 13 and the second tolerance element 14. This advantageously allows a well defined selection of the sliding surface 8b acting during decoupling, which accordingly allows an improved definition of the aforementioned threshold value of the torque.

Figure 3:
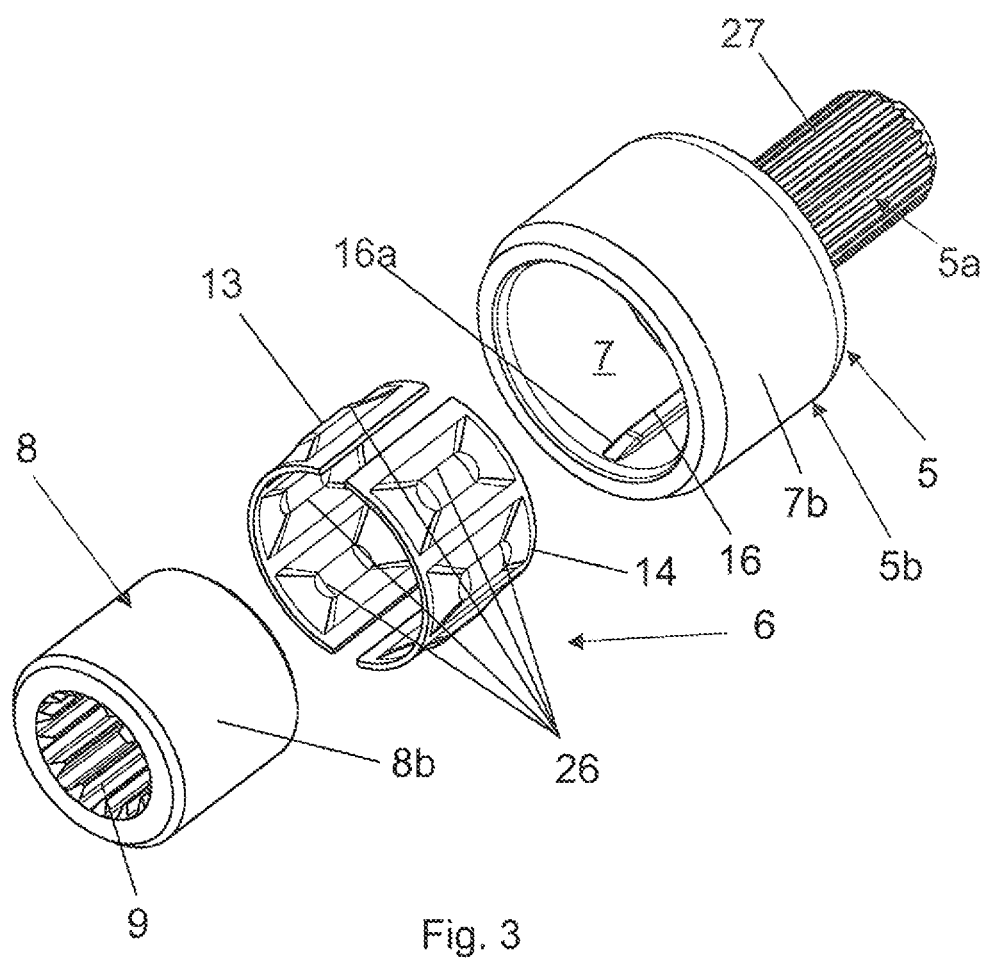
FIG. 3 shows the torque-limiting device from FIG. 1 in an exploded view.

FIG. 3 shows the torque-limiting device 6 from FIG. 1 in an exploded view. In this view, it can be clearly seen that the adapter sleeve 8 is designed as a hollow cylinder and has an inner gear 9 along its inner circumference. The outer circumference, on the other hand, is smooth and forms, as already explained above, an output-side sliding surface 8b.

The first tolerance element 13 and the second tolerance element 14 are designed as partially cylindrical shell segments, wherein both the first tolerance element 13 and the second tolerance element 14 have a plurality of stampings 26 on their outer surface, which abut against the inner side of the side wall 7b of the coupling element 5 when the first tolerance element 13 or the second tolerance element 14 is inserted in the receptacle 7 of the coupling element 5.

As can be clearly seen in the view shown in FIG. 3, the first end 5a of the coupling element 5 is designed in the form of a pin and comprises an external gear 27. The external gear 27 serves here for the rotationally fixed connection to a transmission, in particular, for example, to a drive gearwheel, which can mesh with the external gear 27. Furthermore, the external gear 27 can also be connected directly to a drive shaft having a corresponding opening with corresponding inner gear, so that the coupling element 5 when driven can be set in rotation.

The receptacle 7 provided at the second end 5b of the coupling element of the receptacle 7 provided, which is limited over time by the hollow cylindrical side wall 7b, is dimensioned such that the first tolerance element 13 and the second tolerance element 14 can be inserted therein. Furthermore, the second retaining element 16 designed as a projection can be seen, wherein the retaining element 16 has a chamfer 16a on its side facing the open end of the receptacle 7.

The invention has been explained above with reference to an exemplary embodiment in which the torque-limiting device comprises two tolerance elements. It is understood that the torque-limiting device may also comprise only one tolerance element or three or more tolerance elements. In this case, either only one retaining element or more than two retaining elements are provided, so that the retaining elements can rotationally fix the tolerance elements inserted in the receptacle 7.

What is claimed is:

1. An actuating spindle drive for adjusting a pivotable vehicle flap, the actuating spindle drive comprising
    a housing;
    a spindle rod rotatably mounted in the housing;
    a first coupling element for driving a rotational movement of the spindle rod; and
    a torque-limiting device arranged between the first coupling element and the spindle rod for limiting the torque transmitted from the first coupling element to the spindle rod, the torque-limiting device comprising:
        an adapter sleeve arranged at a first end of the spindle rod in a rotationally fixed manner, and
        a first tolerance element arranged radially between the spindle rod and the first coupling element, the first tolerance element being rotationally fixed to one of the first coupling element and the adapter sleeve,
        wherein the one of the first coupling element and the adapter sleeve has at least one first retaining element,
        wherein the first retaining element is a projection having a first lateral support surface and a second lateral support surface,
        wherein the first retaining element prevents a rotational movement of the first tolerance element relative to the one of the first coupling element and the adapter sleeve by contact between the first retaining element and the first tolerance element.

2. The actuating drive according to claim 1, wherein the first retaining element is formed integrally with the one of the first coupling element and the adapter sleeve.

3. The actuating drive according to claim 2, wherein the first retaining element is integrally formed with the first coupling element.

4. The actuating drive according to claim 1, wherein the first tolerance element is supported at least on the first lateral support surface of the first retaining element.

5. The actuating drive according to claim 4, wherein the first tolerance element is supported on the first lateral support surface and on the second lateral support surface.

6. The actuating drive according to claim 1, wherein the first tolerance element is a partially cylindrical shell element.

7. The actuating drive according to claim 1, wherein the torque-limiting device comprises a second tolerance element.

8. The actuating drive according to claim 7, wherein the second tolerance element is supported at least on the second lateral support surface of the first retaining element.

9. The actuating drive according to claim 1, wherein the one of the first coupling element and the adapter sleeve comprises at least one second retaining element, wherein the second retaining element is a projection having a first lateral support surface and a second lateral support surface.

10. The actuating drive according to claim 9, wherein the first tolerance element is supported on the first lateral support surface of the first retaining element and on the first lateral supporting surface of the second retaining element.

11. The actuating drive according to claim 1, wherein the first coupling element has a hollow cylindrical receptacle that faces the spindle rod and has a base and a side wall.

12. The actuating drive according to claim 11, wherein the first tolerance element and the adapter sleeve are at least partially accommodated in the hollow cylindrical receptacle.

13. The actuating drive according to claim 12, wherein the first retaining element is arranged on an inner side of the side wall of the hollow cylindrical receptacle.

14. The actuating drive according to claim 13, wherein the first tolerance element abuts flat against the inner side wall of the hollow cylindrical receptacle.

15. The actuating drive according to claim 1, wherein a brake assembly is arranged in the housing, wherein the brake assembly comprises a brake housing.

16. The actuating drive according to claim 15, wherein the brake housing is arranged concentrically around a first end of the spindle rod.

17. The actuating drive according to claim 15, wherein the first coupling element at least partially penetrates the brake housing of the brake assembly.

18. The actuating drive according to claim 15, wherein the brake assembly comprises first brake element, a second brake element and a pretensioning means for axially pretensioning the first brake element to the second brake element, wherein the pretensioning means and one of the adapter sleeve and the first tolerance element overlap axially at least in sections.

19. The actuating drive according to claim 15, wherein the torque-limiting device is partially inserted into the brake assembly through an opening provided in the brake housing.

20. The actuating drive according to claim 1, wherein the first coupling element has a hollow cylindrical receptacle that faces the spindle rod and has a base and a side wall, wherein the first retaining element is arranged on an inner side of the side wall of the hollow cylindrical receptacle.

21. The actuating drive according to claim 1, wherein the first tolerance element is connected to the first coupling element such that a rotationally fixed connection between the first tolerance element and the first coupling element is produced and at the same time a pretension is generated, so that the first tolerance element abuts against the inner side of the side wall of the first coupling element.

* * * * *